US007660927B2

(12) United States Patent
Clark et al.

(10) Patent No.: US 7,660,927 B2
(45) Date of Patent: Feb. 9, 2010

(54) APPARATUS AND METHOD TO CONTROL ACCESS TO STORED INFORMATION

(75) Inventors: Brian Dow Clark, Tucson, AZ (US); Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/751,251

(22) Filed: May 21, 2007

(65) Prior Publication Data

US 2008/0294826 A1 Nov. 27, 2008

(51) Int. Cl.
*G06F 12/14* (2006.01)
*G06F 13/00* (2006.01)
(52) U.S. Cl. ...................... 710/200; 710/108
(58) Field of Classification Search ......... 710/106–109, 710/200, 220, 240–241, 244
See application file for complete search history.

(56) References Cited

U.S. PATENT DOCUMENTS

| 5,202,971 A * | 4/1993 | Henson et al. ............... 710/200 |
| 5,613,139 A * | 3/1997 | Brady ......................... 710/200 |
| 6,061,757 A | 5/2000 | Arimilli et al. |
| 6,088,757 A * | 7/2000 | Boonie et al. ............... 710/200 |
| 6,185,650 B1 | 2/2001 | Boonie et al. |
| 6,430,643 B1 | 8/2002 | Arndt |
| 6,539,446 B1 * | 3/2003 | Chan .......................... 710/200 |
| 6,813,666 B2 | 11/2004 | Joffrain |
| 7,120,718 B2 | 10/2006 | Pezzini |
| 2002/0042856 A1 | 4/2002 | Hartwell et al. |
| 2003/0149820 A1 * | 8/2003 | Kolinummi et al. ......... 710/200 |
| 2006/0036782 A1 | 2/2006 | Peterson et al. |
| 2006/0036790 A1 | 2/2006 | Peterson et al. |
| 2006/0104296 A1 * | 5/2006 | Rodrigo ...................... 370/403 |
| 2006/0106964 A1 | 5/2006 | Clark et al. |
| 2006/0282564 A1 | 12/2006 | Casper et al. |

\* cited by examiner

*Primary Examiner*—Thomas J Cleary
(74) *Attorney, Agent, or Firm*—Dale F. Regelman; Quarles & Brady LLP

(57) ABSTRACT

A method is disclosed to control access to stored information. The method supplies a control unit in communication with a computing device and in communication with stored information. If the computing device requests access to that stored information, the method determines if access to the stored information is available. When access to the stored information becomes available, then the method reserves a communication pathway interconnecting the control unit and the requesting computing device, thereby disallowing the sending of non-MPLF unsolicited status via that reserved communication pathway, and provides a message to the computing device, using that reserved communication pathway, granting access to the stored information.

19 Claims, 3 Drawing Sheets

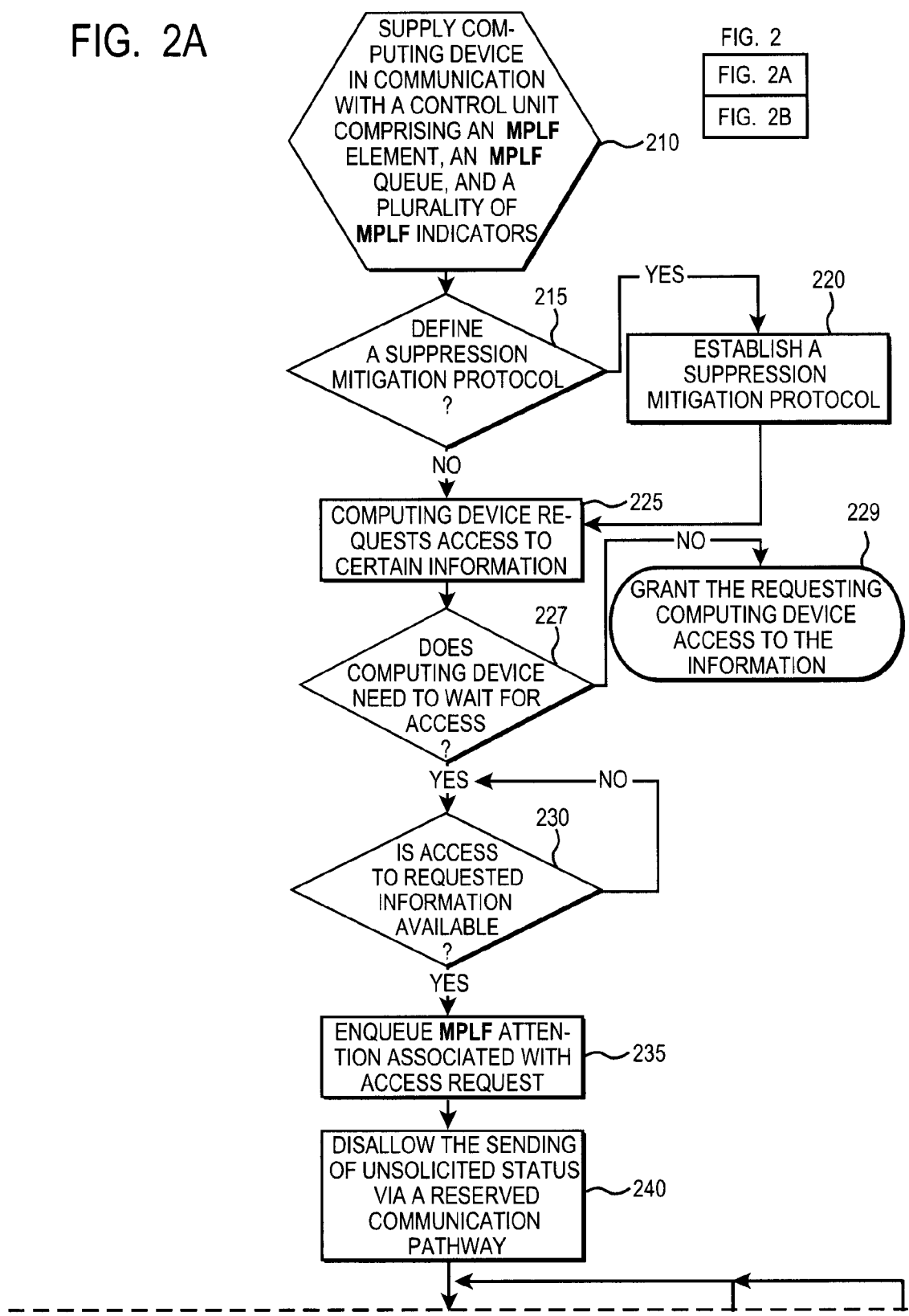

APPARATUS AND METHOD TO CONTROL ACCESS TO STORED INFORMATION

FIELD OF THE INVENTION

The invention is directed to an apparatus and method to control access to stored information.

BACKGROUND OF THE INVENTION

It is known in the art for multiple computing devices to have access to the same stored data. When requesting access to that stored data, a requesting computing device makes a lock request. If the computing device obtains that lock, then only that computing device can access the requested information. Oftentimes, the requesting computing device is notified that a requested lock has become available via an attention interrupt and message.

Using prior art methods, however, such MPLF attention interrupt messages are assigned a lower priority than non-MPLF unsolicited status provided to computing device. For example, a pack change interrupt has a higher priority than an attention interrupt. As a result, when pack change interrupts are initiated for hundreds of devices due to changing states from PPRC Full Duplex to PPRC Suspended after the execution of a PPRC Freeze or Thaw command from the computing device, delivery of an attention interrupt may be delayed for an extended period of time.

SUMMARY OF THE INVENTION

Applicants' invention comprises an apparatus and method to control access to stored information. The method supplies a control unit in communication with a computing device and in communication with the stored information. If the computing device requests access to the stored information, the method determines if access to that stored information is available. If a wait was required, after the wait when access to the stored information becomes available and is granted to the requesting process, then the method reserves a communication pathway interconnecting the control unit and the requesting computing device, thereby disallowing the sending of non-MPLF unsolicited status via that reserved communication pathway, and provides an interrupt then message to the computing device, using that reserved communication pathway, notifying the computing device of access to the stored information.

BRIEF DESCRIPTION OF THE DRAWINGS

The invention will be better understood from a reading of the following detailed description taken in conjunction with the drawings in which like reference designators are used to designate like elements, and in which:

FIG. 2A is a flow chart summarizing the steps of Applicants' method; and

DETAILED DESCRIPTION OF THE PREFERRED EMBODIMENTS

This invention is described in preferred embodiments in the following description with reference to the Figures, in which like numbers represent the same or similar elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
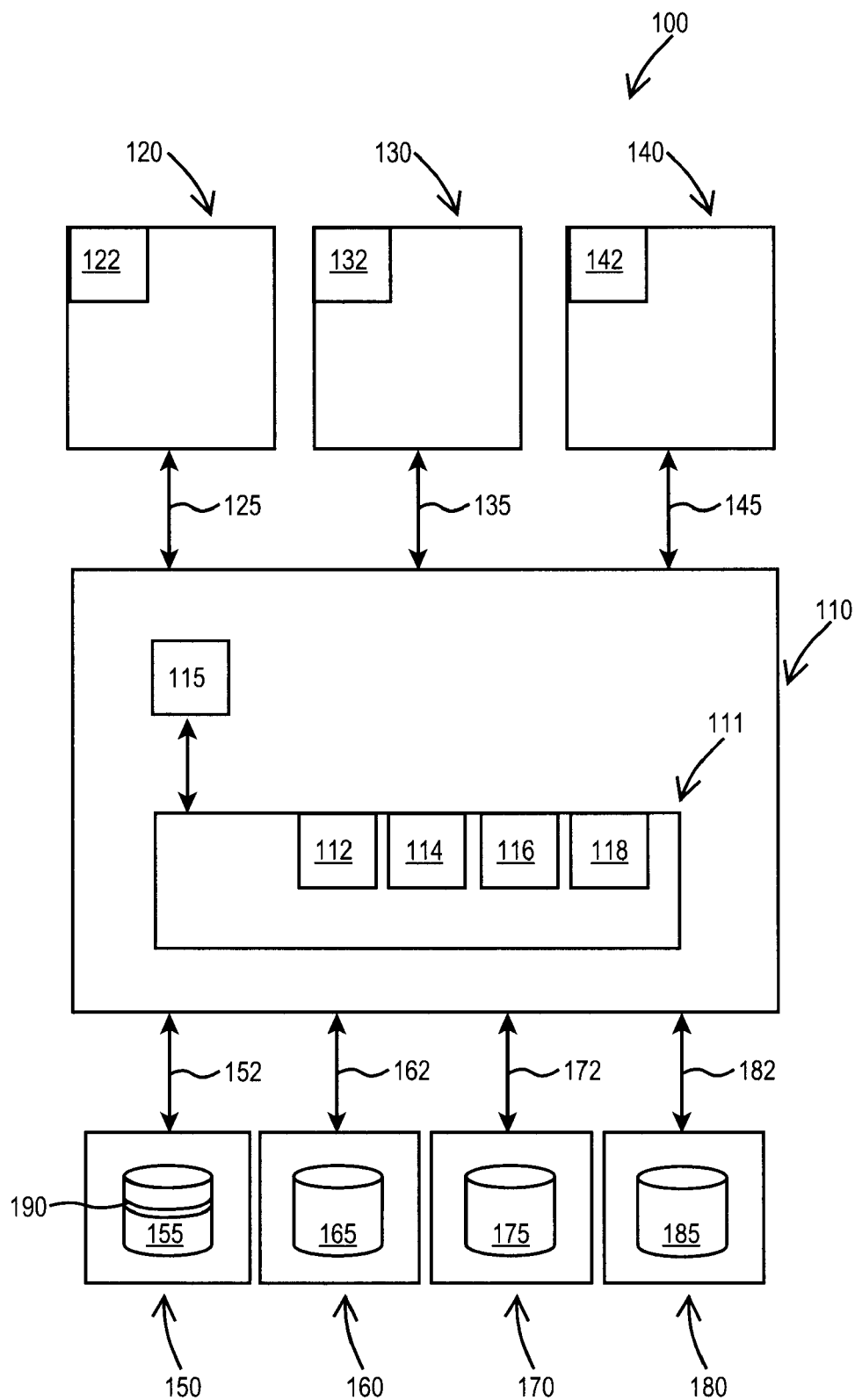
FIG. 1 is a block diagram showing one embodiment of Applicants' storage system.

Applicants' invention comprises an apparatus and method to control access to stored information. FIG. 1 illustrated one embodiment of Applicants' storage system. Referring now to FIG. 1, storage system 100 comprises control unit 110, a plurality of computing devices 120, 130, and 140, in communication with control unit 110, and a plurality of data storage devices 150, 160, 170, and 180, in communication with control unit 110. In certain embodiments, data storage devices 150, 160, 170, and 180, comprise physical devices. In these physical device embodiments, data storage devices 150, 160, 170, and 180, are selected from the group consisting of a tape drive, a magnetic disk drive, an optical disk drive, and an electronic storage device.

In other embodiments, data storage devices 150, 160, 170, and 180, comprise logical devices. In certain embodiments, control unit 110 is collocated with one or more of computing devices 120, 130, and/or 140. In other embodiments, control unit is located remotely from any of the interconnected computing devices.

In the illustrated embodiment of FIG. 1, storage system 100 comprises three computing devices. In other embodiments, Applicants' storage system comprises fewer than three computing devices in communication with control unit 110. In yet other embodiments, Applicants' storage system comprises more that three computing devices in communication with control unit 110.

In certain embodiments, computing devices 120, 130, and 140, each comprise a host computer, a mainframe computer, server, workstation, and combinations thereof, including an operating system such as z/OS, MVS, LINUX, etc. (z/OS is a registered trademark, and MVS is a trademark, of IBM Corporation; and LINUX is a registered trademark of Linus Torvald). In certain embodiments, computing devices 120, 130, and 140, each comprise a Transactional Processing Facility ("TPF"), such as TPF 122, 132, and 142, respectively.

In the illustrated embodiment of FIG. 1, storage system 100 comprises four data storage devices. In other embodiments, Applicants' storage system comprises fewer than four data storage devices in communication with control unit 110. In yet other embodiments, Applicants' storage system comprises more that four data storage devices in communication with control unit 110.

In the illustrated embodiment of FIG. 1, data storage device 150 is shown comprising volume 155. Similarly, data storage devices 160, 170, and 180, are shown comprising volumes 165, 175, and 185, respectively. In certain embodiments, volumes 155, 165, 175, and 185, comprise logical volumes.

In other embodiments, volumes 155, 165, 175, and 185, comprise information storage media. As those skilled in the art will appreciate, if data storage device 150 comprises a tape drive, then information storage medium 155 comprises a magnetic tape storage medium. If data storage device 150 comprises a magnetic disk drive, then information storage medium 155 comprises a magnetic disk. If data storage device 150 comprises an optical disk drive, then information storage medium 155 comprises an optical disk. If data storage device 150 comprises an electronic storage device, then information storage medium 155 is selected from the group consisting of a PROM, EPROM, EEPROM, Flash PROM, compactflash, smartmedia, and the like.

Control unit 110 comprises processor 115 in communication with memory 111. Microcode/instructions 112, multi-path locking facility algorithm ("MPLF") 114, MPLF queue 116, and a plurality of unsolicited status suppression indicators 118, are encoded in memory 111. Control unit communicates with computing device 120 via a plurality of communication pathways 125. In certain embodiments, the plurality of communication pathways 125 utilize an I/O protocol selected from the group consisting of ESCON, FICON, and the like. Similarly, control unit communicates with computing devices 130 and 140 via a plurality of communication pathways 135 and 145, respectively. In certain embodiments, the plurality of communication pathways 135 and 145 each utilize an I/O protocol selected from the group consisting of ESCON, FICON, and the like.

In certain embodiments, the plurality of communication pathways 125, 135, and 145, each comprise (N) logical paths. In certain embodiments, (N) is 1024. In other embodiments, (N) is less than 1024. In still other embodiments, (N) is greater than 1024. In certain embodiments, a subset (M) of the (N) logical communication paths are used to communicate MPLF interrupts from control unit 110 to computing device 120, wherein (M) is greater than or equal to 1 and less than or equal to (N).

Applicants' invention comprises a method to control access to stored information using Applicants' storage system. Because computing devices 120, 130, and 140, can read information from, and/or write information to, the same data storage devices, the TPF element in each computing device controls access to individual records/files through use of logical locks. When requesting access to information encoded in one or more of the data storage devices in communication with the control unit, a requesting computing device sends a lock request to the control unit, wherein that lock request recites a storage address for a particular volume, either logical or physical, and a pathway, either logical or physical, to access that volume.

Applicants' method utilizes a MPLF algorithm comprising MPLF commands and attentions to indicate to a computing device if there is contention for a particular lock, and to further notify that computing device when a requested lock becomes available. A computing device waiting for a lock will not process any additional transactions. Subsequent transactions will be queued behind waiting for the lock. As a result, it is desirable that a communication pathway remain available to notify a waiting computing device that a requested lock has become available.

As a general matter, MPLF attention interrupts are assigned a lower priority than non-MPLF unsolicited status provided by the control unit to an interconnected computing device. By "unsolicited status," Applicants mean an interrupt status sent to the computing device, wherein the computing device is not waiting for the status. For example, a pack change interrupt has a higher priority than an attention interrupt. As a result, when pack change interrupts are initiated for hundreds of devices due to changing states from peer to peer remote copy ("PPRC") Full Duplex to PPRC Suspended after the execution of a PPRC Freeze or Thaw command from the computing device, delivery of a MPLF attention interrupt may be delayed for an extended period of time. In certain embodiments, it is not just the lower priority that delays the MPLF attention interrupts but also the path validation commands that must be issued from the host because of receiving a state change interrupt from the control unit.

Due to the architected priorities and using prior art methods, all the pack changes are presented first followed by the presentation of attention interrupts, even the more critical MPLF attentions. Applicants' method allows MPLF attention interrupts to take priority over non-MPLF unsolicited status.

In certain embodiments, Applicants' method reserves a communication pathway between the control unit and a computing device, wherein only MPLF attention interrupts can utilize that reserved communication pathway. In certain of these embodiments, an indicator is set to alert the control unit that the reserved pathway may not be used to send non-MPLF attention interrupts and messages to the computing device. In certain of these embodiments, the method further comprises a suppression mitigation protocol whereunder one or more non-MPLF unsolicited status may be sent using the reserved communication pathway even if the indicator associated with that communication pathway is set.

Figure 2B:
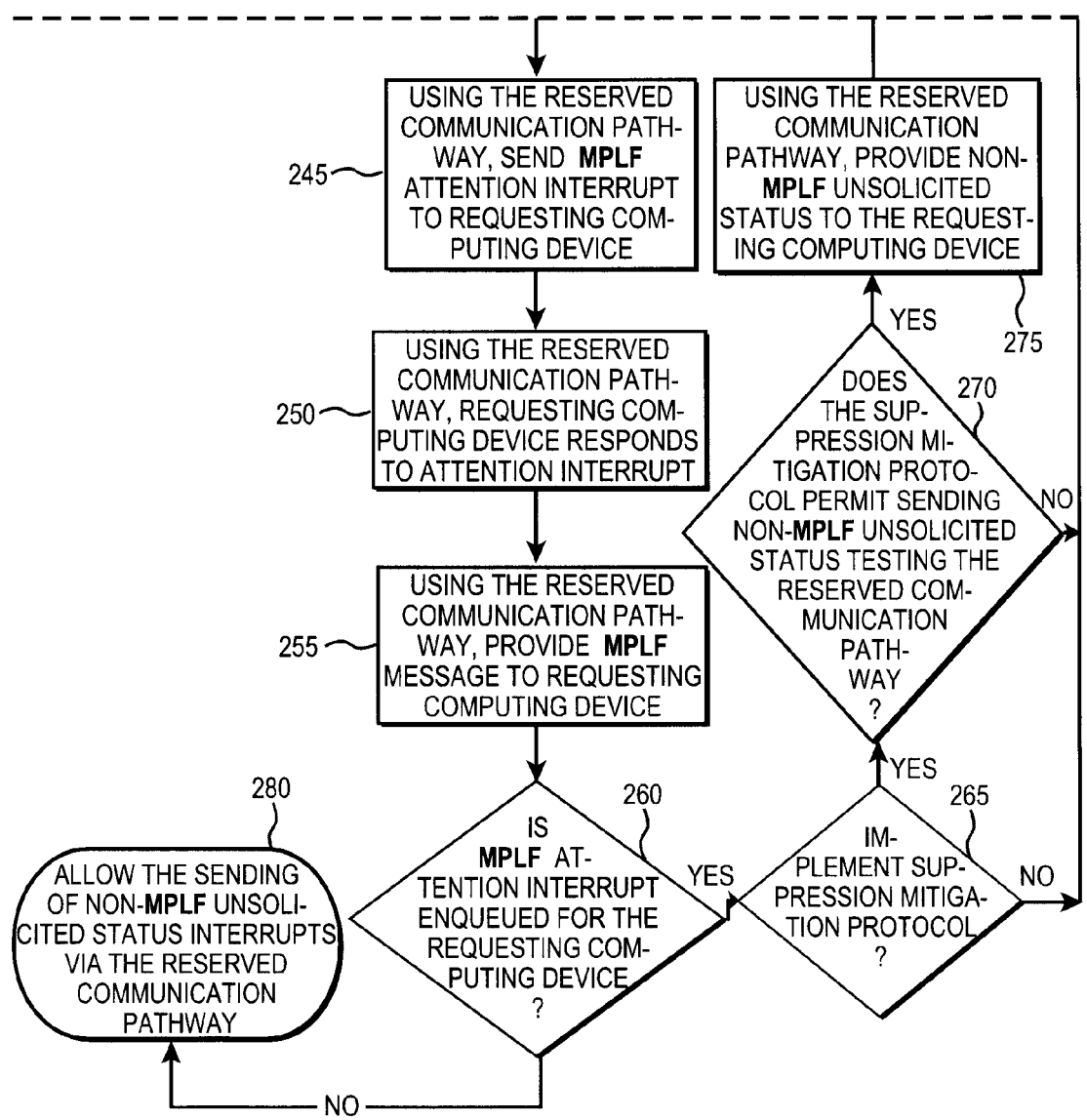
FIG. 2B is a flow chart summarizing additional steps of Applicants' method.

FIG. 2 summarizes the steps of Applicants' method. Referring now to FIG. 2, in step 210 the method supplies a computing device in communication with Applicants' control unit, wherein that control unit is in communication with one or more data storage devices comprising one or more information storage media comprising encoded information.

In step 215, the method determines whether to, in certain circumstances, utilize a suppression mitigation protocol. If Applicants' method elects to utilize a suppression mitigation protocol, then the method transitions from step 215 to step 220 wherein the method establishes a suppression mitigation protocol. In certain embodiments, the suppression mitigation protocol of step 220 is set by the owner and/or operator of the control unit.

Applicants' method transitions from step 220 to step 225. If the method elects in step 215 not to utilize a suppression mitigation protocol, then the method transitions from step 215 to step 225 wherein a computing device in communication with the control unit requests access to information stored in a data storage device in communication with the control unit. In certain embodiments, step 225 comprises generating and providing a lock request. In certain embodiments, the lock request recites a logical volume, a logical communication pathway to that logical volume, and a storage address on that logical volume. In certain embodiments, the storage address comprises one or more designated tracks. For example, track 190 (FIG. 1) is disposed on volume 155 (FIG. 1) which is disposed in storage device 150.

Applicants' method transitions from step 225 to step 227 wherein the method determines if the computing device must wait for access. In certain embodiments, step 227 is performed by Applicants' control unit. In certain embodiments, step 227 is performed by a MPLF algorithm disposed in Applicants' control unit.

If the method determines in step 227 that the computing device does not need to wait for access to the requested information, then the method transitions from step 227 to step 229 wherein the method grants the requesting computing device access to the requested information. Alternatively, if the method determines in step 227 that the computing device must wait for access, then the method transitions from step 227 to step 230 wherein the method determines if access to the requested information has become available. In certain embodiments, step 230 is performed by Applicants' control unit. In certain embodiments, step 230 is performed by a MPLF algorithm disposed in Applicants' control unit.

If the method determines in step 230 that access to the requested information has not become available, then the method continues to monitor the availability of the requested information. Alternatively, If the method determines in step 230 that access to the requested information has become available, then the method transitions from step 230 to step 235 wherein the method enqueues a MPLF attention interrupt associated with the pending lock request. In certain embodiments, step 235 comprises enqueuing a lock request in a MPLF queue, such as queue 116 (FIG. 1) disposed in Applicants' control unit. In certain embodiments, step 235 is performed by Applicants' control unit. In certain embodiments, step 235 is performed by a MPLF algorithm disposed in Applicants' control unit.

The method transitions from step 235 to step 240 wherein the method reserves a communication pathway interconnecting the control unit and the requesting computing device of step 225, thereby disallowing the sending of non-MPLF unsolicited status via that reserved communication pathway. In certain embodiments, step 240 further comprises activating an indicator associated with the reserved communication pathway. In certain embodiments, step 240 is performed by Applicants' control unit. In certain embodiments, step 240 is performed by a MPLF algorithm disposed in Applicants' control unit.

As an example, if host 120 makes a lock request in step 225, and if the requested lock is available, or has become available, then in step 240 the method reserves one of the (N) communication pathways comprising the plurality of communication links 125 for use by MPLF attention interrupts only. In certain embodiments, the method further activates an indicator associated with that reserved pathway thereby showing that the communication pathway is reserved for use by MPLF attention interrupts only.

In certain embodiments, Applicants' control unit 110 (FIG. 1) comprises a plurality of unsolicited status suppression indicators 118 (FIG. 1), wherein each unsolicited status suppression indicator is associated with a different communication pathway interconnecting Applicants' control unit 110 and one of the computing devices in communication with that control unit. In certain embodiments, each unsolicited status suppression indicator is associated with a different MPLF communication pathway interconnecting Applicants' control unit 110 and one of the computing devices in communication with that control unit.

In certain embodiments, each of the plurality of unsolicited status suppression indicators 118 (FIG. 1) comprises a bit, wherein that bit is set to either first setting or a second setting, wherein if the bit is set to the first setting then the associated communication pathway is available for use by any unsolicited status, and wherein if the bit is set to the second setting then the associated communication pathway is reserved for use by MPLF attention interrupts.

In certain embodiments, the plurality of unsolicited status suppression indicators 118 (FIG. 1) comprises a database associating each communication pathway between control unit 110 and an interconnected computing device with a different database indicator field. If a database indicator field recites a first setting then the associated communication pathway is available for use by any unsolicited status, but if a database indicator field recites a second setting then the associated communication pathway is reserved for use by MPLF attention interrupts.

In certain embodiments, the plurality of unsolicited status suppression indicators 118 (FIG. 1) comprises a lookup associating each communication pathway between control unit 110 and an interconnected computing device with a different indicator field. If an indicator field recites a first setting then the associated communication pathway is available for use by any unsolicited status, and if an indicator field recites a second setting then the associated communication pathway is reserved for use by MPLF attention interrupts.

The method transitions from step 240 to step 245 wherein the method provides, using the reserved communication pathway of step 240, a MPLF attention interrupt to the requesting computing device. In certain embodiments, step 245 comprises providing an enqueued MPLF attention interrupt from the MPLF queue. In certain embodiments, step 245 is performed by Applicants' control unit. In certain embodiments, step 245 is performed by a MPLF algorithm disposed in Applicants' control unit.

In step 250, the requesting computing device, using the reserved communication pathway of step 240, responds to the MPLF attention interrupt of step 245 by querying the control unit for a MPLF message. In certain embodiments, step 250 is performed by a TPF element disposed in the requesting computing device.

In step 255, the method, using the reserved communication pathway of step 240, provides to the requesting computing device a MPLF message indicating that access to the requested information is available. In certain embodiments, step 255 comprises providing the requested lock to the requesting computing device. In certain embodiments, step 255 is performed by Applicants' control unit. In certain embodiments, step 255 is performed by a MPLF algorithm disposed in Applicants' control unit.

Applicants' method transitions from step 255 to step 260 wherein the method determines if the MPLF queue contains another MPLF attention interrupt for the requesting computing device. In certain embodiments, step 260 is performed by Applicants' control unit. In certain embodiments, step 260 is performed by a MPLF algorithm disposed in Applicants' control unit.

If the method determines in step 260 that the MPLF queue does not comprise another MPLF attention interrupt for the requesting computing device, then the method transitions from step 260 to step 280 wherein the method again allows the sending of non-MPLF unsolicited status to the requesting computing device of step 220 via the reserved communication pathway of step 240. In certain embodiments, step 280 further comprises deactivating the unsolicited status suppression indicator associated with the reserved communication pathway of step 240.

If the method determines in step 260 that the MPLF queue does comprise another MPLF attention interrupt for the requesting computing device, then the method transitions from step 260 to step 265 wherein the method determines whether to implement a suppression mitigation protocol. In certain embodiments, step 265 is performed by Applicants' control unit. In certain embodiments, step 265 is performed by a MPLF algorithm disposed in Applicants' control unit.

In embodiments wherein the method elects in step 215 not to define a suppression mitigation protocol, then the method elects not to implement such a suppression mitigation protocol in step 265, and the method transitions from step 265 to step 245 and continues as described herein. On the other hand, if the method establishes a suppression mitigation protocol in step 220, then the method may elect in step 265 to implement that suppression mitigation protocol.

If the method elects in step 265 to implement the suppression mitigation protocol of step 220, then the method transitions from step 265 to step 270 wherein the method determines if the suppression mitigation protocol permits sending non-MPLF unsolicited status to the requesting computing device of step 225 using the reserved communication pathway of step 240. In certain embodiments, step 270 is performed by Applicants' control unit. In certain embodiments, step 270 is performed by a MPLF algorithm disposed in Applicants' control unit.

In certain embodiments, the suppression mitigation protocol of step 220 establishes a threshold reservation time interval. In these embodiments, in step 270 the method determines if the reserved communication pathway has been reserved for a time interval that exceeds the threshold reservation time interval. If the method determines in step 270 that the reserved communication pathway has been reserved for a time interval that exceeds the threshold reservation time interval, then the method permits providing one or more non-MPLF unsolicited status to the requesting computing device of step 225 using the reserved communication pathway of step 240.

In certain embodiments, the suppression mitigation protocol of step 220 establishes a threshold ratio between the number of pending non-MPLF unsolicited status for the requesting computing device and the number of enqueued MPLF attention interrupts for the requesting computing device. In these embodiments, in step 270 the method determines if the actual ratio between the number of pending non-MPLF unsolicited status and the number of enqueued MPLF attention interrupts exceeds that threshold ratio. If the method determines in step 270 that the actual ratio between the number of pending non-MPLF unsolicited status and enqueued MPLF attention interrupts exceeds that threshold ratio, then the method permits providing one or more non-MPLF unsolicited status to the requesting computing device of step 225 using the reserved communication pathway of step 240.

If the method in step 270 does not permit sending non-MPLF unsolicited status to the requesting computing device of step 225 using the reserved communication pathway of step 240, then the method transitions from step 270 to step 245 and continues as described herein. Alternatively, if the method in step 270 permits sending non-MPLF unsolicited status to the requesting computing device of step 225 using the reserved communication pathway of step 240, then the method transitions from step 270 to step 275 wherein the method, using the reserved communication pathway of step 240, provides one or more non-MPLF unsolicited status to the requesting computer of step 225. The method transitions from step 275 to step 245 and continues as described herein.

In certain embodiments, individual steps recited in FIG. 2 may be combined, eliminated, or reordered.

In certain embodiments, Applicants' invention includes instructions, such as instructions 112 (FIG. 1), residing in memory, such as memory 111 (FIG. 1), disposed in Applicants' control unit, such as control unit 110 (FIG. 1), to perform one or more of steps 230, 235, 240, 245, 250, 255, 260, 265, 270, 275, and/or 280, recited in FIG. 2.

In other embodiments, Applicants' invention includes instructions residing in any other computer program product, where those instructions are executed by a computer external to, or internal to, control unit 110, to perform one or more of steps 230, 235, 240, 245, 250, 255, 260, 265, 270, 275, and/or 280, recited in FIG. 2. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to control access to stored information, comprising the steps of:

supplying a control unit in communication with a computing device and in communication with stored information, wherein said control unit comprises a multi-path locking facility ("MPLF");

requesting by said computing device access to said stored information;

determining if access to said stored information has become available;

operative when access to said stored information becomes available:

reserving a communication pathway interconnecting said control unit and said requesting computing device, thereby disallowing the sending of non-MPLF interrupts via that reserved communication pathway;

providing a MPLF attention interrupt and message to said computing device, using said reserved communication pathway, granting access to said stored information; establishing a suppression mitigation protocol, whereunder a non-MPLF unsolicited status may be sent to said computing device using said reserved communication pathway; determining whether to implement said suppression mitigation protocol; operative if said suppression mitigation protocol is implemented, providing non-MPLF unsolicited status to said computing device using said reserved communication pathway.

2. The method of claim 1, wherein:

said stored information is disposed in a volume at a storage address;

said requesting step comprises providing to said control unit a lock request which recites said volume, a logical communication pathway to that volume, and a storage address on that volume.

3. The method of claim 1, wherein said MPLF performs said reserving step and said providing step.

4. The method of claim 3, wherein said providing step comprises:

sending to said computing device a MPLF attention interrupt;

responding by said computing device to said MPLF attention interrupt;

allocating a lock to said computing device, wherein said lock specifies said volume, said logical communication pathway, and said storage address.

5. The method of claim 1, wherein said control unit further comprises a queue, said method further comprising the step of enqueuing a MPLF attention interrupt associated with information access request when access to said stored information becomes available.

6. The method of claim 5, further comprising the steps of:
after performing said providing step, determining if said queue comprises an enqueued MPLF attention interrupt for said computing device;
operative if said queue comprises an enqueued attention interrupt for said computing device, sending said enqueued attention interrupt to said computing device.

7. The method of claim 1, wherein:
said control unit further comprises a plurality of unsolicited status suppression indicators;
said reserving step further comprises activating an unsolicited status suppression indicator associated with said reserved communication pathway.

8. The method of claim 7, wherein said determining whether to implement said suppression mitigation protocol step further comprises:
establishing a threshold reservation time interval;
determining if said reserved communication pathway has been reserved for a time interval greater than said threshold reservation time interval;
operative if said reserved communication pathway has been reserved for a time interval greater than said threshold reservation time interval, implementing said suppression mitigation protocol.

9. The method of claim 7, wherein said determining whether to implement said suppression mitigation protocol step further comprises:
establishing a threshold ratio between the number of pending non-MPLF unsolicited status and the number of enqueued MPLF attention interrupts;
determining if said threshold ratio is exceeded;
operative if said threshold ratio is exceeded, implementing said suppression mitigation protocol.

10. A control unit, in communication with a computing device and in communication with stored information, comprising a multi-path locking facility ("MPLF"), a processor, and a computer readable medium having computer readable program code disposed therein to control access to said stored information, the computer readable program code comprising a series of computer readable program steps to effect:
receiving from said computing device a request for access to said stored information;
determining if access to said stored information is available;
operative when access to said stored information becomes available:
reserving a communication pathway interconnecting said control unit and said requesting computing device, thereby disallowing the sending of non-MPLF unsolicited status via that reserved communication pathway;
providing a MPLF attention interrupt and message to said computing device, using said reserved communication pathway, granting access to said stored information; a suppression mitigation protocol, said computer readable program code further comprising a series of computer readable program steps to effect: determining if said suppression mitigation protocol permits sending non-MPLF unsolicited status to said computing device using said reserved communication pathway; operative if said suppression mitigation protocol permits sending a non-MPLF interrupt to said computing device using said reserved communication pathway, providing a non-MPLF interrupt to said computing device using said reserved communication pathway.

11. The control unit of claim 10, wherein said control unit further comprises a plurality of unsolicited status suppression indicators, and wherein the computer readable program code to reserve said reserved communication pathway further comprises computer readable program code comprising a series of computer readable program steps to effect activating an unsolicited status suppression indicator associated with said reserved communication pathway.

12. The control unit of claim 11, wherein said control unit further comprises a queue, said computer readable program code further comprising a series of computer readable program steps to effect:
determining if said queue comprises an enqueued MPLF attention interrupt for said computing device;
operative if said queue comprises an enqueued MPLF attention interrupt for said computing device, providing said enqueued attention interrupt to said computing device.

13. The control unit of claim 10, wherein said computer readable program code to determine if said suppression mitigation protocol permits sending non-MPLF unsolicited status using said reserved communication pathway, further comprises a series of computer readable program steps to effect:
retrieving a pre-determined threshold reservation time interval;
determining if said reserved communication pathway has been reserved for a time interval greater than said threshold reservation time interval;
operative if said reserved communication pathway has been reserved for a time interval greater than said threshold reservation time interval, permitting non-MPLF unsolicited status to be sent to said computing device using said reserved communication pathway.

14. The control unit of claim 10, wherein said computer readable program code to determine if said suppression mitigation protocol permits sending non-MPLF unsolicited status using said reserved communication pathway, further comprises a series of computer readable program steps to effect:
retrieving a pre-determined threshold ratio between the number of pending non-MPLF unsolicited status and the number of enqueued MPLF attention interrupts;
determining if the actual ratio between the number of pending non-MPLF unsolicited status and the number of enqueued MPLF attention interrupts exceeds said threshold ratio;
operative if the actual ratio between the number of pending non-MPLF unsolicited status and the number of enqueued MPLF attention interrupts exceeds said threshold ratio, permitting non-MPLF status unsolicited to be sent to said computing device using said reserved communication pathway.

15. A computer program product encoded in an information storage medium disposed a control unit comprising a processor and a multi-path locking facility ("MPLF") and in communication with a computing device and in communication with stored information, said computer program product being useable with said processor to control access to stored information comprising:
computer readable program code which causes said programmable computer processor to receive from said computing device a request for access to said stored information;
computer readable program code which causes said programmable computer processor to determine if access to said stored information is available;
computer readable program code which, when access to said stored information becomes available, causes said programmable computer processor to:
reserve a communication pathway interconnecting said control unit and said requesting computing device, thereby disallowing the sending of non-MPLF unsolicited status via that reserved communication pathway; and provide a MPLF attention interrupt and message to said computing device, using said reserved communication pathway, granting access to said stored information; a suppression mitigation protocol, computer readable program code which causes said programmable computer processor to determine if said suppression mitigation protocol permits sending a non-MPLF interrupt using said reserved communication pathway; computer readable program code which, if said suppression mitigation protocol permits sending a non-MPLF interrupt using said reserved communication pathway, causes said programmable computer processor to provide a non-MPLF interrupt to said computing device using said reserved communication pathway.

16. The computer program product of claim 15, wherein said control unit further comprises a plurality of unsolicited status suppression indicators, wherein the computer readable program code which causes said programmable computer processor to reserve said reserved communication pathway further comprises computer readable program code which causes said programmable computer processor to activate an unsolicited status suppression indicator associated with said reserved communication pathway.

17. The computer program product of claim 16, wherein said control unit further comprises a queue, further comprising:
    computer readable program code which causes said programmable computer processor to determine if said queue comprises an enqueued MPLF attention interrupt for said computing device;
    computer readable program code which, if said queue comprises an enqueued MPLF attention interrupt for said computing device, causes said programmable computer processor to provide said enqueued attention interrupt to said computing device.

18. The computer program product of claim 17, wherein said computer readable program code which causes said programmable computer processor to determine if said suppression mitigation protocol permits sending a non-MPLF interrupt using said reserved communication pathway, further comprises:
    computer readable program code which causes said programmable computer processor to retrieve a pre-determined threshold reservation time interval;
    computer readable program code which causes said programmable computer processor to determine if said reserved communication pathway has been reserved for a time interval greater than said threshold reservation time interval;
    computer readable program code which, if said reserved communication pathway has been reserved for a time interval greater than said threshold reservation time interval, causes said programmable computer processor to permit a non-MPLF interrupt to be sent to said computing device using said reserved communication pathway.

19. The computer program product of claim 17, wherein said computer readable program code which causes said programmable computer processor to determine if said suppression mitigation protocol permits sending a non-MPLF interrupt using said reserved communication pathway, further comprises:
    computer readable program code which causes said programmable computer processor to retrieve a pre-determined threshold ratio between the number of pending non-MPLF unsolicited status and the number of enqueued MPLF attention interrupts;
    computer readable program code which causes said programmable computer processor to determine if the actual ratio between the number of pending non-MPLF unsolicited status and the number of enqueued MPLF attention interrupts exceeds said threshold ratio;
    computer readable program code which, if the actual ratio between the number of pending non-MPLF unsolicited status and the number of enqueued MPLF attention interrupts exceeds said threshold ratio, causes said programmable computer processor to permit a non-MPLF interrupt to be sent using said reserved communication pathway.

* * * * *